US012686955B2

(12) United States Patent
Kim et al.

(10) Patent No.: US 12,686,955 B2
(45) Date of Patent: Jul. 21, 2026

(54) 2D NANOMATERIAL FIBER AND METHOD OF FABRICATING THE SAME

(71) Applicant: Korea Advanced Institute of Science and Technology, Daejeon (KR)

(72) Inventors: Sang Ouk Kim, Daejeon (KR); Hong Ju Jung, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 966 days.

(21) Appl. No.: 17/443,231

(22) Filed: Jul. 22, 2021

(65) Prior Publication Data

US 2022/0025554 A1      Jan. 27, 2022

(30) Foreign Application Priority Data

Jul. 23, 2020    (KR) ........................ 10-2020-0091351

(51) Int. Cl.
| | |
|---|---|
| D01F 9/12 | (2006.01) |
| C01B 32/19 | (2017.01) |
| C01B 32/198 | (2017.01) |
| C01B 32/23 | (2017.01) |
| C08K 3/04 | (2006.01) |

(Continued)

(52) U.S. Cl.
CPC ............... D01F 9/12 (2013.01); C01B 32/19 (2017.08); C01B 32/198 (2017.08); C01B 32/23 (2017.08); C08K 3/042 (2017.05); D01D 5/06 (2013.01); D01D 10/00 (2013.01); D01F 11/12 (2013.01); *C01P 2002/72* (2013.01); *C01P 2002/82* (2013.01); *C01P 2002/85* (2013.01); *C01P 2004/02* (2013.01);

*C01P 2004/03* (2013.01); *C01P 2004/24* (2013.01); *C08K 2201/011* (2013.01); *D10B 2101/02* (2013.01); *D10B 2101/122* (2013.01); *D10B 2401/061* (2013.01); *D10B 2401/063* (2013.01); *D10B 2401/16* (2013.01)

(58) Field of Classification Search
CPC . B01D 2239/025; B01J 20/205; B01J 21/185; D01F 9/12; D01F 11/12; C08K 2201/011; Y10T 428/2973
See application file for complete search history.

(56) References Cited

U.S. PATENT DOCUMENTS

| | | | | |
|---|---|---|---|---|
| 2005/0250895 A1* | 11/2005 | Baker | ...................... | H01B 1/24 524/496 |
| 2008/0182154 A1 | 7/2008 | Kim et al. | | |
| 2017/0081786 A1* | 3/2017 | Lozano | .................... | D01F 9/14 |

FOREIGN PATENT DOCUMENTS

| | | |
|---|---|---|
| CN | 110148770 A | 8/2019 |
| JP | 2010-238646 A | 10/2010 |

(Continued)

OTHER PUBLICATIONS

Jung et al., "Self-Planarization of High-Performance Graphene Liquid Crystalline Fibers by Hydration", ACS Central Science, vol. 6—10 pages (Jun. 11, 2020).

(Continued)

*Primary Examiner* — Elizabeth M Imani
(74) *Attorney, Agent, or Firm* — Knobbe, Martens, Olson & Bear, LLP

(57) ABSTRACT

Provided is a 2D nanomaterial fiber. The 2D nanomaterial fiber includes plate-type fibrous cross sections formed by orienting a 2D nanomaterial in a longitudinal direction and stacking the oriented 2D nanomaterial.

6 Claims, 10 Drawing Sheets

(51) Int. Cl.
    D01D 5/06         (2006.01)
    D01D 10/00      (2006.01)
    D01F 11/12       (2006.01)

(56)             References Cited

FOREIGN PATENT DOCUMENTS

| | | | |
|---|---|---|---|
| JP | 5397375 | B2 | 1/2014 |
| KR | 10-2008-0006232 | A | 1/2008 |
| KR | 10-2012-0031451 | A | 4/2012 |
| KR | 10-2019-0002755 | A | 1/2019 |
| KR | 10-2019-0022172 | A | 3/2019 |
| KR | 10-2020-0069810 | A | 6/2020 |

OTHER PUBLICATIONS

Nadeem Baig, "Two-Dimensional Nanomaterials: A critical review of recent progress, properties, applications, and future directions." Composites Part A: Applied Science and Manufacturing, vol. 165, Feb. 2023, 107362.
Rafiei-Sarmazdeh et. al., "Two-Dimensional Nanomaterials." IntechOpen, May 22, 2019.
Yadav et. al., "Synthesis, processing, and applications of 2D (nano)materials: A sustainable approach." Surfaces and Interfaces, vol. 39, Jul. 2023, 102925.

* cited by examiner

2D NANOMATERIAL FIBER AND METHOD OF FABRICATING THE SAME

CROSS-REFERENCE TO RELATED APPLICATIONS

This application claims priority under 35 U.S.C. § 119 to Korean Patent Application No. 10-2020-0091351, filed on Jul. 23, 2020, in the Korean Intellectual Property Office, the disclosure of which is incorporated herein by reference in its entirety.

TECHNICAL FIELD

The following disclosure relates to a fiber containing a 2D nanomaterial (2D nanomaterial fiber) and a method of fabricating the same, and more particularly, to a 2D nanomaterial fiber having significantly improved electrical and mechanical properties, and a method of fabricating the same.

BACKGROUND

Two-dimensional (2D) materials such as graphene, graphene oxide, MXene, transition metal dichalcogenides, and the like are next-generation core materials that are applicable to the various fields of industry such as the internet of things, flexible devices, ultra-low power elements, wearable devices, next-generation batteries, and the like.

In recent years, a method of fabricating fibers using a spinning process of 2D materials has been developed.

Korean Patent Publication No. 2020-0069810 discloses the relate technology.

The disclosure of this section is to provide background information relating to the present disclosure. Applicant does not admit that any information contained in this section constitutes prior art.

SUMMARY

An embodiment of the present invention is directed to providing a fiber containing a 2D material, which prevents degradation of intrinsic properties of the 2D material, has improved electrical and thermal characteristics, and shows excellent mechanical characteristics, and a method of fabricating the same.

In a general aspect, a 2D nanomaterial fiber contains a 2D nanomaterial, and includes a plate-type fibrous cross section formed by orienting the 2D nanomaterial in a longitudinal direction of the fiber and stacking the oriented 2D nanomaterial.

In the 2D nanomaterial fiber according to one embodiment of the present invention, the plate-type fibrous cross section may be elongated in a transverse direction of the fiber, and a ratio (D/t) of a thickness (t) of the plate-type fibrous cross section to a length (D) of the plate-type fibrous cross section in a transverse direction may be greater than or equal to 2.

In the 2D nanomaterial fiber according to one embodiment of the present invention, the cross section of the fiber may consist of one plate-type fibrous cross section.

In the 2D nanomaterial fiber according to one embodiment of the present invention, the 2D nanomaterial may include graphene, graphene oxide, MXene, a transition metal dichalcogenide (TMD), a metal oxide, silicene, germanene, borophene, stanene, phosphorene, hexagonal-boron nitride (h-BN), or a combination thereof.

The 2D nanomaterial fiber according to one embodiment of the present invention may further include polymers.

In the 2D nanomaterial fiber according to one embodiment of the present invention, a Herman's orientation parameter based on the wide-angle X-ray scattering (WAXS) results may be greater than or equal to 0.8.

In the 2D nanomaterial fiber according to one embodiment of the present invention, a modulus of elasticity of the fiber may satisfy the following Expression 1:

$$YM1/YM2 \geq 2 \qquad \text{[Expression 1]}$$

wherein YM1 represents a modulus of elasticity of the 2D nanomaterial fiber, and YM2 represents a modulus of elasticity of a reference fiber which is a 2D nanomaterial fiber having a circular cross section, which consists of the same 2D nanomaterial.

In the 2D nanomaterial fiber according to one embodiment of the present invention, a tensile strength of the fiber may satisfy the following Expression 2:

$$TS1/TS2 \geq 2.5 \qquad \text{[Expression 2]}$$

wherein TS1 represents a tensile strength of the 2D nanomaterial fiber, and TS2 represents a tensile strength of a reference fiber which is a 2D nanomaterial fiber having a circular cross section, which consists of the same 2D nanomaterial.

In the 2D nanomaterial fiber according to one embodiment of the present invention, the stacking may be spontaneous layer-by-layer stacking of the 2D nanomaterial.

A method of fabricating the 2D nanomaterial fiber as described above is provided.

The method of fabricating a 2D nanomaterial fiber according to the present invention may include preparing a dispersion which includes a dispersion medium and a 2D nanomaterial and is in a liquid-crystal phase; wet-spinning the dispersion on a coagulation solution having miscibility with the dispersion medium to form fibers; and inducing spontaneous flattening of the fibers.

In the method of fabricating a 2D nanomaterial fiber according to one embodiment of the present invention, the 2D nanomaterial may include graphene, graphene oxide, MXene, a transition metal dichalcogenide (TMD), a metal oxide, silicene, germanene, borophene, stanene, phosphorene, hexagonal-boron nitride (h-BN), or a combination thereof.

In the method of fabricating a 2D nanomaterial fiber according to one embodiment of the present invention, the spontaneous flattening may be performed during a coagulation process in which diffusion of the dispersion medium contained in the fibers spun during the wet spinning is removed.

In the method of fabricating a 2D nanomaterial fiber according to one embodiment of the present invention, the dispersion medium may be a mixed solvent of a first solvent and a second solvent having a dielectric constant higher than the first solvent.

In the method of fabricating a 2D nanomaterial fiber according to one embodiment of the present invention, a difference in the dielectric constant between the first solvent and the second solvent may be greater than or equal to 20.

In the method of fabricating a 2D nanomaterial fiber according to one embodiment of the present invention, a diffusion removal rate of the dispersion medium contained in the fibers spun during the wet spinning may be controlled by adjusting a content of the second solvent contained in the dispersion medium.

The method of fabricating a 2D nanomaterial fiber according to one embodiment of the present invention may further include a post-treatment step of subjecting the spontaneously flattened fibers to a chemical reduction treatment or annealing the spontaneously flattened fibers.

DETAILED DESCRIPTION OF EMBODIMENTS

Figure 1A:
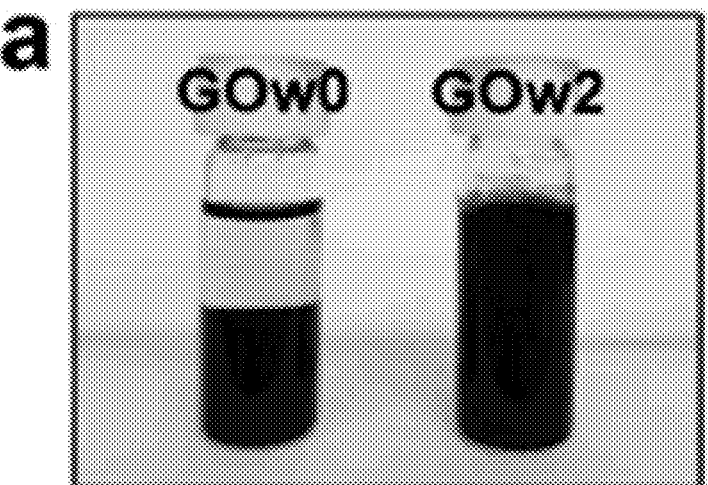
FIGS. 1A-1D show an optical image and polarizing microscopic images observed for dispersions prepared according to one embodiment of the present invention.

Hereinafter, a 2D nanomaterial fiber according to embodiments of the present invention and a method of fabricating the same will be described in detail with reference to the accompanying drawings. The drawings presented hereinbelow are shown as one example to sufficiently provide the scope of the present invention to those skilled in the art. Therefore, it should be understood that the present invention may be embodied in various forms, but is not intended to be limiting in the drawing presented hereinbelow. In this case, the drawing presented hereinbelow may be shown in an exaggerated manner to make the scope of the present invention more clearly apparent. In this case, unless otherwise defined, the technical and scientific terms used herein have the same meaning as commonly understood by one of ordinary skill in the art to which the present invention pertains. In the following description and the accompanying drawings, a description of known functions and configurations, which may unnecessarily obscure the subject matter of the present invention, will be omitted.

Also, the singular forms "a," "an," and "the" used in the specification of the present disclosure and the appended claims should be intended to refer to those including plural referents unless the context clearly dictates otherwise.

Throughout the specification of the present disclosure and the appended claims, the terms first, second, etc. are not limited by these terms, but are only used to distinguish one element from another.

Throughout the specification of the present disclosure and the appended claims, it will be further understood that the terms "comprises," "comprising," "includes," and/or "including," when used herein, specify the presence of stated features and/or components thereof, but do not preclude the presence or addition of one or more other features and/or components thereof unless the context clearly dictates otherwise.

Throughout the specification of the present disclosure and the appended claims, when a part of a film (a layer), a region, a component, etc. is said to be "above" or "on" another part thereof, this includes not only the case where it is directly over another part but also other films (layers), regions, components, etc. in the middle.

An example provides a method of fabricating fibers using a spinning process capable of maximizing an interaction and an orientation property of 2D materials. During fibrillization of 2D materials, the 2D materials which are randomly present in a non-directional manner are aligned in an axial direction of the fibers while being discharged through a spinning nozzle, and thus may have an orientation property.

However, liquid-crystal fibers are fabricated by spinning 2D materials through a nozzle having a circular or oval shape during fibrillization of 2D materials in order to minimize a surface area of the 2D materials like common polymer fibers. In this case, in such fibers having a cylindrical shape, lots of defects such as pores, wrinkles, and the like may occur in the fibers because the fibers are folded or bent due to an electrical repulsive force between 2D nanomaterials or the high shape anisotropy. These defects may result in degraded mechanical properties of the fibers, and even when the 2D materials have very excellent thermal and electrical characteristics, the characteristics may also be damaged due to the fibrillization of the 2D materials. Therefore, there is a demand for development of technology capable of fibrillizing the 2D materials without causing any damage to the intrinsic properties of the 2D materials.

This applicant has paid attention to the fact that the excellent intrinsic properties of a 2D nanomaterial are damaged due to the bending of the 2D nanomaterial with very high anisotropy, wrinkles, or the like, during fibrillization of the 2D nanomaterial. This applicant has conducted in-depth research to prevent the bending or wrinkles of the 2D nanomaterial during the fibrillization using wet spinning, and found that, when a coagulation speed of fibers is reduced during the wet spinning, the very high anisotropy which has caused the defects such as bending or wrinkles rather induces the spontaneous layer-by-layer stacking of the 2D nanomaterial, and confirmed that the mechanical properties, electrical characteristics, and the like of the 2D nanomaterial fiber are remarkably improved due to this layer-by-layer stacking. Therefore, embodiments of the present invention have been completed based on these findings.

The 2D nanomaterial fiber based on the above-described findings is a fiber containing a 2D nanomaterial, and includes a plate-type fibrous cross section formed by orienting the 2D nanomaterial in a longitudinal direction of the fiber and stacking the oriented 2D nanomaterial.

The stacking of the 2D nanomaterial may be layer-by-layer stacking, particularly, spontaneous layer-by-layer stacking. The layer-by-layer stacking may refer to a structure in which layers of the 2D nanomaterial are stacked to face each other. The spontaneous layer-by-layer stacking may mean that a 2D nanomaterial spontaneously moves in the fibers coagulated without any application of separate external stimuli (pressure, heat, and the like) so that the 2D nanomaterial is stacked in a layer-by-layer manner. Therefore, a shape (a cross-sectional shape) of a fiber whose coagulation is completed and in which the spontaneous layer-by-layer stacking occurs may be different from a shape (a cross-sectional shape) of a nozzle through which the fiber is being wet-spun. Here, the shape (a cross-sectional shape)

of the fiber may have an elongated shape in one direction of in-plane directions of the 2D nanomaterial relative to the shape (a cross-sectional shape) of the nozzle. In this case, one direction of the in-plane directions of the 2D nanomaterial may correspond to a transverse direction of the fiber. It should be interpreted that layers stacked during the layer-by-layer stacking should not be necessarily limited to monolayers of the 2D nanomaterial, and thus also includes multi-layered flakes generated by stacking a few monolayers. Also, in the case of the layer-by-layer stacking, each layer may be oriented in an axial direction (a longitudinal direction) of the fiber.

Because the 2D nanomaterial fiber has a structure in which a 2D nanomaterial having very high anisotropy is stacked, the 2D nanomaterial fiber may include a plate-type fibrous cross section. This plate-type shape is a shape formed by stacking the 2D nanomaterial. Therefore, a plane of a plate in the plate-type fibrous cross section may be parallel with a layer of the 2D nanomaterial. In this case, the cross section (a cross section in a direction perpendicular to the length) of the 2D nanomaterial fiber should not be generally interpreted to be limited to the flat plate-type shape. Because the 2D nanomaterial fiber has a structure in which the 2D nanomaterial is spontaneously stacked, the 2D nanomaterial fiber has an elongated shape in one direction (an in-plane direction of a 2D nanomaterial layer) in aspect of the cross section of the fiber. In this case, the 2D nanomaterial fiber may be bent irregularly and/or macroscopically in an elongated direction. Also, this bent plate should be interpreted to have a plate-type fibrous cross section. However, although the stacked plates are bent, the plates themselves are formed by stacking a 2D material, which has substantially a flat plane that is not bent in a microscopic aspect, in a layer-by-layer manner. As a result, a direction (surface normal) perpendicular to a surface of a plate at any point of the plate may be identical to a direction (plane normal) perpendicular to a layer of the 2D nanomaterial positioned on a surface of the plate at the corresponding point. However, the present invention is not intended to exclude a macroscopically flat plate-type cross-sectional region.

Accordingly, the 2D nanomaterial fiber may consist of one plate-type fibrous cross section. That is, a single plate may have a shape in which the fiber is bent irregularly and/or macroscopically in a transverse direction (an elongated direction) of the plate in aspect of the cross section of the fiber. This means that the 2D nanomaterial fiber generally has a structure in which the 2D nanomaterial is stacked in a layer-by-layer manner.

According to one example embodiment, the plate-type fibrous cross section is elongated in a transverse direction of the fiber, and a ratio (D/t) of a thickness (t) of the plate-type fibrous cross section to a length (D) of the plate-type fibrous cross section in a transverse direction is greater than or equal to 2, specifically greater than or equal to 4, greater than or equal to 6, greater than or equal to 8, greater than or equal to 10, greater than or equal to 12, greater than or equal to 14, greater than or equal to 16, greater than or equal to 18, or greater than or equal to 20, and may be substantially less than or equal to 100, or less than or equal to 50. In this case, the length of the plate-type fibrous cross section in the transverse direction may refer to a length from one end to the other end of a plate in a transverse direction regardless of the shape of the plate which is bent irregularly in a transverse direction. As one practical example, the thickness of the plate-type fibrous cross section may be of the order of several micrometers (μm), more substantially in a range of approximately 1 to 8 μm, but the present invention is not limited by the specific dimensions of the fiber.

According to one example embodiment, the 2D nanomaterial fiber may have a Herman's orientation parameter of 0.80 or more, specifically 0.82 or more, 0.84 or more, 0.86 or more, 0.88 or more, 0.90 or more, or 0.91 or more, as based on the wide-angle X-ray scattering results.

The Herman's orientation parameter based on the wide-angle X-ray scattering spectrum is an indicator that represents an orientation property of the 2D nanomaterial in an in-plane direction in the fiber fabricated by stacking the 2D nanomaterial, and also is an indicator that represents a stacking degree at which the 2D nanomaterial is stacked in a flat plane (an unbent plane) state in the fiber. In the wide-angle X-ray scattering spectrum, the wide-angle X-ray scattering spectrum may be an intensity spectrum according to an azimuthal angle, and the Herman's orientation parameter may be calculated based on the standard for a scattering intensity of a (002) plane according to the azimuthal angle (Φ), and the Herman's orientation function. The Herman's orientation function (f) is as defined as below.

$$f = \frac{1}{2}\left(3 \int_0^{\frac{\pi}{2}} \frac{I(\phi)\ \cos^2\phi\ \sin\phi\ d\phi}{I(\phi)\sin\phi\ d\phi} - 1\right)$$

The higher Herman's orientation parameter means that the 2D nanomaterial constituting the fiber is not optionally tilted as the Herman's orientation parameter increases, but is stacked in a layer-by-layer manner so that the in-plane directions of the 2D nanomaterial are oriented to be parallel to each other.

The 2D nanomaterial (a 2D nanocrystal) may include graphene, graphene oxide, MXene, a transition metal dichalcogenide (TMD), a metal oxide, silicene, germanene, borophene, stanene, phosphorene, hexagonal-boron nitride (h-BN), or a combination thereof (a mixture thereof).

In this case, it is apparent that graphene may include reduced graphene oxide (RGO). Graphene oxide is graphene whose surface is oxidized by a strong oxidizing agent such as a strong acid, and the like, or by supercritical and subcritical treatment, and the like. In this case, the graphene oxide may refer to graphene having an oxygen-containing functional group (a hydroxyl group, a carboxyl group, or the like) formed on a surface thereof.

MXene is a transition metal carbide, a transition metal nitride, or a transition metal carbonitride, all of which have 2D crystallinity. MXene may satisfy the formula: $M_{n+1}X_n$ according to the nominal composition. A transition metal (M) may include one or more transition metals selected from Groups IIIB, IVB, VB, VIB, and VIIB. According to one example embodiment, the transition metal (M) may include titanium (Ti), zirconium (Zr), hafnium (Hf), vanadium (V), chromium (Cr), manganese (Mn), scandium (Sc), molybdenum (Mo), niobium (Nb), tantalum (Ta), yttrium (Y), tungsten (W), or a combination thereof, but the present invention is not limited thereto. Here, X may be carbon, nitrogen, or carbon and nitrogen. According to one example embodiment, X may be carbon. In n may be 1, 2 or 3. In the MXene, the transition metal carbide, the transition metal nitride, or the transition metal carbonitride, which has a 2D structure, may be generally terminated with a surface functional group represented by "Tx." In consideration of the surface functional group, the MXene may be represented by the formula: $M_{n+1}X_nTx$. In this case, the surface functional group (Tx)

may include an alkoxide, a carboxylate, a halide, a hydroxide, a hydride, an oxide, a nitride, a sulfide, a thiol, or a combination thereof.

The transition metal dichalcogenide is a compound that has a 2D layered structure consisting of a transition metal and a chalcogen element, and may satisfy the formula: $MX_2$ (M=transition metal, and X=chalcogen, for example, S, Se, or the like). The 2D transition metal dichalcogenide has a structure in which a single element layer of a transition metal is positioned between two element layers of chalcogen. In this case, three atomic layers may be combined to form one layer of the 2D nanomaterial.

The 2D metal oxide may include ruthenium oxide, manganese oxide, titanium oxide, vanadium oxide, chromium oxide, iron oxide, nickel oxide, copper oxide, zinc oxide, zirconium oxide, niobium oxide, molybdenum oxide, lanthanum oxide, hafnium oxide, tantalum oxide, tungsten oxide, iridium oxide, platinum oxide, palladium oxide, osmium oxide, $NiCo_2O_4$, $Ba_5Ta_4O_{15}$, $CaNaNb_3O_{10}^{2-}$, $Sr_2Nb_3O^{10-}$, $TiTaO_5^-$, $Ti_5NbO_{14}^{3-}$, $TiNbO_5^-$, $Ca_2Na_{n-3}$ $Nb_nO_{3n+1}^-$ (n=4, 5, 6), $Ca_2Nb_{3-x}Ta_xO_{10}^-$ (x=0.3, 1, 1.5), $Ca_2Nb_{3-x}Rh_xO_{10-\delta}^-$, $SrNb_2O_6F^-$, $Sr_{1.5}Ta_3O_{10}^{2-}$, $CaNaTa_3O_{10}^{2-}$, $Ca_2Ta_3O_{10-x}N_y^-$, $SrLaTi_2TaO_{10}^{2-}$, $LaNb_2O_7$, $(Ca,Sr)_2Nb_3O_{10}$, $Bi_4Ti_3O_{12}$, $Ca_2Ta_2TiO_{10}$, $Ca_2Nb_3O_{10}$, $SrTa_2O_7$, $Bi_2SrTa_2O_9$, $Bi_4Ti_3O_{12}$, $La_{0.9}Eu_{0.05}Nb_2O_7$, $La_{0.7}Tb_{0.3}Ta_2O_7$, $Gd_{1.4}Eu_{0.6}Ti_3O_{10}$, $Bi_2SrTa_2O_9$, $Cs_4W_{11}O_{36}Li_2MnO_4$, $LiCoO_2$, $LiMn_2O_4$, $Ga_2O_3$, $LiNiO_2$, $CaCu_3Ti_4O_{12}$, $Li(Ni,Mn,Co)O_2$, $LiFePO_4$, $Li(Mn,Co,Ni)PO_4$, $Li(Mn,Fe)O_2$, $Li_y(Cr_xMn_{2-x})O_{4+z}$, $LiCoMnO_4$, $Ag_3PO_4$, $BaTiO_3$, $NiTiO_3$, $SrTiO_3$, $Sr_2Nb_2O_7$, $Sr_2Ta_2O_7$, and the like, but the present invention is not limited thereto.

Because the 2D nanomaterial fiber according to embodiments of the present invention has a structure in which a 2D nanomaterial is oriented in an axial direction of the fiber and simultaneously stacked in a layer-by-layer manner, defects of the 2D nanomaterial, such as wrinkles, bending, or the like, may be minimized, and a strong interaction between the 2D nanomaterials may be caused. Because scattering of electric charges moving in the fiber is minimized, the 2D nanomaterial fiber may have remarkably improved mechanical properties, thereby preventing the intrinsic properties of the 2D nanomaterial from being damaged due to the fibrillization of the 2D nanomaterial.

According to one example embodiment, the modulus of elasticity of the fiber may satisfy the following Expression 1:

$$YM1/YM2 \geq 2 \qquad \text{[Expression 1]}$$

wherein YM1 represents a modulus of elasticity of the 2D nanomaterial fiber, and YM2 represents a modulus of elasticity of a reference fiber which is a 2D nanomaterial fiber having a circular cross section, which consists of the same 2D nanomaterial. Specifically, the ratio YM1/YM2 may be greater than or equal to 2.0, greater than or equal to 2.1, greater than or equal to 2.2, or greater than or equal to 2.3, and the ratio YM1/YM2 may be substantially less than or equal to 10.0, less than or equal to 8, or less than or equal to 5.

In practice, the modulus of elasticity of the 2D nanomaterial fiber may be greater than or equal to 50 GPa, greater than or equal to 55 GPa, greater than or equal to 60 GPa, greater than or equal to 65 GPa, or greater than or equal to 70 GPa. The modulus of elasticity may be less than or equal to 150 GPa, but the present invention is not limited thereto.

According to one example embodiment, the tensile strength of fiber may satisfy the following Expression 2:

$$TS1/TS2 \geq 2.5 \qquad \text{[Expression 2]}$$

wherein TS1 represents a tensile strength of the 2D nanomaterial fiber, and TS2 represents a tensile strength of a reference fiber which is a 2D nanomaterial fiber having a circular cross section, which consists of the same 2D nanomaterial. Specifically, the ratio TS1/TS2 may be greater than or equal to 2.5, greater than or equal to 2.6, greater than or equal to 2.7, greater than or equal to 2.8, greater than or equal to 2.9, greater than or equal to 3.0, greater than or equal to 3.1, or greater than or equal to 3.2, and the ratio TS1/TS2 may be substantially less than or equal to 10.0, less than or equal to 8, or less than or equal to 6.

In practice, the tensile strength of the 2D nanomaterial fiber may be greater than or equal to 400 MPa, greater than or equal to 450 MPa, greater than or equal to 500 MPa, greater than or equal to 520 MPa, greater than or equal to 540 MPa, greater than or equal to 560 MPa, greater than or equal to 580 MPa, or greater than or equal to 590 MPa. The tensile strength may be less than or equal to 900 MPa, but the present invention is not limited thereto.

According to one example embodiment, the 2D nanomaterial contained in the fiber may include a conductive 2D nanomaterial, and the electrical conductivity of the fiber may satisfy the following Expression 3. Representative examples of the conductive 2D nanomaterial may include graphene (including reduced graphene oxide), or transition metal dichalcogenides such as $VS_2$, $TiS_2$, $NiSe_2$, $PdS_2$, $PtS_2$, $PtSe_2$, and the like, but the present invention is not limited thereto.

$$C1/C2 > 1.2 \qquad \text{[Expression 3]}$$

wherein C1 represents an electrical conductivity of the 2D nanomaterial fiber, and C2 represents an electrical conductivity of a reference fiber which is a 2D nanomaterial fiber having a circular cross section, which consists of the same 2D nanomaterial. Specifically, the ratio C1/C2 may be greater than or equal to 1.2, greater than or equal to 1.3, greater than or equal to 1.4, greater than or equal to 1.5, greater than or equal to 1.6, or greater than or equal to 1.7. Specifically, the ratio C1/C2 may be less than or equal to 5, or less than or equal to 4, but the present invention is not limited thereto.

In practice, the electrical conductivity of the 2D nanomaterial fiber may be greater than or equal to 350 S/cm, greater than or equal to 370 S/cm, greater than or equal to 390 S/cm, greater than or equal to 400 S/cm, greater than or equal to 410 S/cm, greater than or equal to 420 S/cm, greater than or equal to 430 S/cm, greater than or equal to 440 S/cm, or greater than or equal to 450 S/cm. The electrical conductivity may be less than or equal to 900 S/cm, but the present invention is not limited thereto.

In Expressions 1 to 3, the reference fiber may refer to a fiber that is identical to the 2D nanomaterial fiber according to one example embodiment of the present invention but has a circular fibrous cross section. In this case, an area of the circular cross section of the reference fiber may be substantially identical to an area of the cross section of the 2D nanomaterial fiber according to one example embodiment of the present invention. The term "being substantially identical" may mean that the area of the circular cross section is in a range of 0.8 to 1.2 when it is assumed that the area of the cross section of the 2D nanomaterial fiber according to one example embodiment of the present invention is set to 1. Also, the reference fiber may have a structure in which a 2D nanomaterial constituting the fiber is oriented in a longitudinal direction of the fiber. In addition to the shape of the fiber, the reference fiber may also consist of substantially the same material as the 2D nanomaterial fiber according to one example embodiment of the present invention. In this case, the term "substantially the same material" means that the reference fiber includes the same 2D nanomaterial, has the same composition when the fiber contains two or more 2D nanomaterials, and has the same average diameter as that of the 2D nanomaterial. In terms of the fabrication method, the term "substantially the same material" may mean that the reference fiber and the 2D nanomaterial fiber according to one example embodiment of the present invention are formed by wet-spinning the same dispersion.

According to one example embodiment, a change in electrical conductivity of the 2D nanomaterial fiber may satisfy the following Expression 4 after the 2D nanomaterial fiber is subjected to the following bending test.

Bending test conditions: bending radius=6 mm, and unidirectional bending: number of repetitions=1,000

$$0.90 \leq C(BT)/C(0) \leq 1.00 \qquad \text{[Expression 4]}$$

wherein $C(0)$ represents an electrical conductivity of the 2D nanomaterial fiber before a bending test, and $C(BT)$ represents an electrical conductivity of the 2D nanomaterial fiber after the bending test.

Specifically, the ratio $C(BT)/C(0)$ may be greater than or equal to 0.90, greater than or equal to 0.91, greater than or equal to 0.92, greater than or equal to 0.93, greater than or equal to 0.94, greater than or equal to 0.95, greater than or equal to 0.96, greater than or equal to 0.97, greater than or equal to 0.98, or greater than or equal to 0.99, and substantially may be 1. That is, the electrical conductivities before the bending test and after the bending test may be substantially identical in an allowable range of deviation in measurement of the electrical conductivity.

According to one example embodiment, the 2D nanomaterial fiber may not contain a binding component such as an organic binder or a metal salt. In practice, the 2D nanomaterial fiber may consist of the 2D nanomaterial.

According to one example embodiment, the 2D nanomaterial fiber may further contain an organic matter, specifically, a polymer in addition to the 2D nanomaterial. The polymer may be a natural or synthetic polymer such as an ethylene-based resin, a propylene-based resin, a styrene-based resin, a methacrylic resin, a vinyl alcohol-based resin, a vinyl chloride-based resin, an olefin-based resin, an ester-based resin, an amide-based resin, a urethane-based resin, a carbonate-based resin, a phenol-based resin, a urea-based resin, a melamine-based resin, an unsaturated ester-based resin, an epoxy-based resin, a silicone-based resin, a fluorine-based resin, a phthalate-based resin, a protein, a carbohydrate, a polysaccharide, or the like. As one practical example, the polymer may include a polymethyl methacrylate (PMMA) resin, a polyethylene terephthalate (PET) resin, a polyethylene (PE) resin, a low-density polyethylene (LDPE) resin, a linear low-density polyethylene (LLDPE) resin, a polypropylene (PP) resin, a polystyrene (PS) resin, a polyisoprene resin, an ethylene vinyl acetate (EVA) resin, a polyethylene carbonate resin, a polypropylene polycarbonate resin, a phenol-formaldehyde resin, a polyethylene terephthalate (PET) resin, a polyethylene naphthalate (PEN) resin, a polyimide (PI) resin, a polycarbonate (PC) resin, triacetyl cellulose (TAC), a polyethersulfone (PES) resin, a nylon resin, a styrene butadiene rubber (SBR), an isoprene rubber (IR), a butadiene rubber (BR), an ethylene propylene rubber (EPM), an ethylene propylene diene rubber (EPDM), an acrylate rubber (ACM), an ethylene acrylate rubber (AEM), an acrylonitrile butadiene rubber (NBR), a hydrogenated acrylonitrile butadiene rubber (HNBR), a chloroprene rubber (CR), a chlorosulfonated polyethylene (CSM), an ethylene vinyl acetate rubber (EVM), a silicone rubber (VSI), gelatin, collagen, hyaluronic acid, glycosaminoglycan, sodium alginate, alginate, hyaluronan, agarose, starch, polyhydroxybutyrate, fibrin, gluten, albumin, elastin, a poly(lactide), a poly(glycolide), a poly(lactide-co-glycolide), a polyanhydride, a polyorthoester, a polyether ester, a polycaprolactone, a polyester amide, a poly(butyric acid), a poly(valeric acid), polyurethane, gelatin, pectin, dextran, hyaluronic acid or a salt thereof, collagen, agar, Arabic gum, xanthan gum, acacia gum, Karaya gum, tragacanth gum, guar gum, carrageenan acid, alginic acid, an alginic acid salt, chitosan, methyl cellulose, ethyl cellulose, hydroxyethyl cellulose, carboxymethyl cellulose, soluble starch, pullulan, dextrin, carboxymethyl starch, dialdehyde starch, polyvinyl alcohol, polyvinyl pyrrolidone, polyvinyl methacrylate, polyacrylic acid and a salt thereof, polyethylene oxide, polypropylene oxide, a polyethylene oxide-polypropylene oxide copolymer, a carboxyl group-containing acrylic resin, a carboxyl group-containing polyester resin, a water-soluble polyamide, water-soluble polyurethane, maltodextrin, polydextrose, and the like, but the present invention is not limited thereto. It is desirable that the polymer is a polymer material that is easily soluble in the corresponding dispersion medium in consideration of the dispersion medium used in a dispersion of the 2D nanomaterial. In this case, the polymer may have a weight average molecular weight of approximately 10,000 to 1,000,000 g/mol, but the present invention is not limited thereto. It is desirable that a content of the polymer in the 2D nanomaterial fiber is a content of the 2D nanomaterial which may be percolated into the fiber. As one practical example, the 2D nanomaterial fiber may include 0.001% by weight to 99.9% by weight of the polymer, based on the total weight of the fiber.

Embodiments of the present invention include a method of fabricating the above-described 2D nanomaterial fibers.

The method of fabricating 2D nanomaterial fibers according to embodiments of the present invention includes preparing a dispersion which includes a dispersion medium and a 2D nanomaterial and is in a liquid-crystal phase; wet-spinning the dispersion on a coagulation solution having miscibility with the dispersion medium to form fibers; and inducing spontaneous flattening of the fibers.

The spontaneous flattening of the spun fibers may be performed in the coagulation solution. Specifically, the spontaneous flattening may be performed in a coagulation process of removing the diffusion of the dispersion medium contained in the spun fibers during the wet spinning.

In the spun fibers in the coagulation solution, the diffusion of the dispersion medium contained in the fiber is removed so that the dispersion medium is coagulated. In a fibrillization method using spinning of a typical 2D nanomaterial, the coagulation is generally completed in 10 seconds. In such a short coagulation time, 2D nanomaterials spun in a round fibrous cross section through a nozzle are substantially hardened in a spun state as it is.

However, when the coagulation is delayed to increase the coagulation time by 30 seconds or more, specifically, 40 seconds or more, desirably 60 seconds or more, more desirably 80 seconds or more, the 2D nanomaterial is spontaneously stacked in the fibers in a layer-by-layer manner during the coagulation due to the liquid-crystal phase characteristics of the dispersion and the high intrinsic anisotropy of the 2D nanomaterial, and the fibers may be spontaneously flattened. In this case, the coagulation time may be substantially less than or equal to 300 seconds, or less than or equal to 200 seconds, but the present invention is not particularly limited thereto.

The delay of coagulation may be achieved by delaying a speed at which the diffusion of the dispersion medium contained in the spun fibers is removed. The coagulation speed may heavily depend on the surface tension between solvents and the imbibition rate as the function of viscosity. Therefore, the coagulation may be delayed by reducing the viscosity of the dispersion medium and increasing the surface tension to reduce the imbibition rate.

Therefore, the dispersion medium may be a mixed solvent in which two or more solvents are mixed, and a second solvent may have a surface tension higher than a first solvent. Specifically, the second solvent may have a surface tension 1.2- to 3-fold, specifically 1.3- to 2.5-fold, and more specifically, 1.5- to 2.0-fold higher than the surface tension (on the basis of 20° C. in the atmosphere) of the first solvent.

Furthermore, the coagulation may be delayed as an interaction between the dispersion medium and the 2D nanomaterial becomes stronger. Specifically, when the 2D nanomaterial contains any one or more polar heteroatoms selected from the group consisting of N, O, and S, the coagulation of the fibers may be delayed with an increasing dielectric constant of the solvent directly associated with a dipole.

In this regard, the dispersion medium may be a mixed solvent in which two or more solvents are mixed, and a second solvent may have a dielectric constant higher than a first solvent. Specifically, a difference in dielectric constant (on the basis of 25° C.) between the first solvent and the second solvent may be greater than or equal to 20, greater than or equal to 25, or greater than or equal to 30, and may be substantially less than or equal to 50.

As described above, the coagulation may be delayed only through the imbibition rate, or delayed only through the interaction between the 2D nanomaterial and the dispersion medium. However, to delay the coagulation by 30 seconds or more, specifically 40 seconds or more, desirably 60 seconds or more, and more desirably 80 seconds or more, the coagulation is desirably delayed through both of the imbibition rate and the interaction between the 2D nanomaterial and the dispersion medium. The above-described coagulation time may be secured when the dispersion medium contains 4% by weight or more, specifically 6% by weight or more, more specifically 8% by weight or more, substantially 20% by weight, or 15% by weight or less of a second solvent, based on the total mass (100% by weight) of the dispersion medium.

Therefore, the 2D nanomaterial (a 2D nanocrystal) may be a 2D nanomaterial including polar heteroatoms, such as graphene oxide, MXene, a transition metal dichalcogenide (TMD), a metal oxide, hexagonal-boron nitride (h-BN), and the like, in terms of the long-term stable delay of the coagulation. In this case, the fabrication method according to one example embodiment is more effective in the fibrillization of the 2D nanomaterial including such polar heteroatoms.

In embodiments of the present invention, however, the 2D nanomaterial is not limited to 2D nanomaterials including the polar heteroatoms. Although graphene, silicene, germanene, borophene, stanene, phosphorene, and the like do not contain polar heteroatoms, the spontaneous flattening may be induced by adjusting the imbibition rate to delay the coagulation time.

On the other hand, the spontaneous flattening of a 2D nanomaterial which does not contain polar heteroatoms may be induced by wet-spinning a dispersion in which the 2D nanomaterial which does not contain polar heteroatoms is mixed with the 2D nanomaterial including polar heteroatoms. Specifically, when the 2D nanomaterial including polar heteroatoms and the 2D nanomaterial which does not contain polar heteroatoms are mixed in the dispersion, the 2D nanomaterial which does not contain the polar heteroatoms is situated under a circumstance in which the coagulation is delayed due to a strong interaction between the solvent and the 2D nanomaterial including polar heteroatoms. As a result, the flattening of the 2D nanomaterial which does not contain polar heteroatoms may be induced as well. In addition, the 2D nanomaterial including polar heteroatoms has a driving power to be stacked in a layer-by-layer manner due to a relatively strong interaction between the 2D nanomaterials caused by the polar heteroatoms. Therefore, the layer-by-layer stacking of the 2D nanomaterial including polar heteroatoms acts like a template so that the 2D nanomaterial which does not contain polar heteroatoms, which is mixed with the 2D nanomaterial including polar heteroatoms, can also be easily stacked in a layer-by-layer manner.

As described above, when the dispersion includes both of the 2D nanomaterial including polar heteroatoms and the 2D nanomaterial which does not contain polar heteroatoms, the 2D nanomaterial which does not contain polar heteroatoms may be easily stacked in a layer-by-layer manner due to a coagulation delay effect caused by the interaction between the solvent and the 2D nanomaterial including polar heteroatoms, and a driving force for stronger spontaneous flattening of the 2D nanomaterial including polar heteroatoms. To facilitate the stacking of the 2D nanomaterial which does not contain polar heteroatoms with the aid of the 2D nanomaterial including polar heteroatoms, it is desirable that the dispersion contains no more than 30% by weight, and more specifically no more than 25% by weight of the 2D nanomaterial which does not contain polar heteroatoms, based on 100% by weight of the solid contents (including the 2D nanomaterial including polar heteroatoms and the 2D nanomaterial which does not contain polar heteroatoms) contained in the dispersion.

The 2D nanomaterial contained in the dispersion may have an average diameter of approximately 1 μm to 50 μm, specifically approximately 1 μm to 30 μm, and more desirably approximately 2 μm to 15 μm, but the present invention is not particularly limited thereto. The average diameter may be an average diameter calculated based on the diameter of a circle by measuring each of areas in the 2D nanomaterial on an image of the 2D nanomaterial observed using a scanning electron microscope, and the like, and converting each of the areas into a circle having the same area. In this case, the number of 2D nanomaterials whose sizes are measured may be greater than or equal to 50, specifically greater than or equal to 100, and substantially greater than or equal to 500, but the present invention is not particularly limited thereto.

The dispersion may contain 5 mg/mL or more, specifically 5 to 30 mg/mL, and more specifically 10 to 20 mg/mL of the 2D nanomaterial, but the present invention is not particularly limited thereto.

When necessary, the dispersion may further contain an organic matter, specifically a polymer, in addition to the 2D nanomaterial. When the dispersion containing the polymer is used, fibers in which the polymer forms a complex with the 2D nanomaterial may be fabricated. It is desirable that a content of the polymer in the dispersion is properly set in consideration of the content of the 2D nanomaterial and the content of the polymer in the finally fabricated fibers.

It is desirable that the dispersion medium of the dispersion is a solvent known to stably disperse the 2D nanomaterial. When the dispersion further contains the polymer, it is desirable that the dispersion medium is a solvent used to stably dissolve the polymer. However, it is satisfactory that two or more solvents, which satisfy the surface tension ratio, desirably a difference between the surface tension ratio and the dielectric constant as described above, are mixed and used.

Specifically, when the 2D nanomaterial is a 2D nanomaterial including polar heteroatoms, the dispersion medium may be a polar solvent. The polar solvent may be an amine-based solvent, an ether-based solvent, water, or a mixed solvent thereof. As one example, the amine-based solvent may include dimethylformamide, N-methyl-2-pyr-rolidone, dimethylacetamide, and the like, and the ether-based solvent may include tetrahydrofuran, 2-methyltetra-hydrofuran, dimethyl ether, dibutyl ether, and the like, but the present invention is not limited thereto. Considering the polar solvents as specifically listed above, a representative second solvent which satisfies the above-described differ-ence between the surface tension ratio and the dielectric constant, may include water. As the spontaneous flattening of the 2D nanomaterial by the layer-by-layer stacking in the fiber in a gel state during coagulation according to the delay of coagulation is realized, the dispersion may not contain a metal salt serving to assist in the coagulation, and may not contain a polymer additive capable of suppressing the spon-taneous movement of the 2D nanomaterial.

The spinning of the dispersion may be wet spinning. The wet spinning is a method which includes extruding a dis-persion through a spinning hole (an orifice or a nozzle) in a coagulation solution to solidify the extruded dispersion in a fibrous phase in the coagulation solution. In this case, it goes without saying that fibers obtained in the coagulation solu-tion may be wound in the coagulation solution, or wound out of the coagulation solution According to one example embodiment, the spinning temperature of the dispersion may be in a range of 10 to 50° C., specifically in a range of 20 to 30° C., and substantially room temperature (25° C.±±3° C.), but the present invention is not limited thereto. Also, a discharge speed of the disper-sion during the spinning of the dispersion may be in a range of 0.1 mL/min to 0.7 mL/min, but the present invention is not limited thereto. The winding speed may correspond to the discharge speed, but the present invention is not limited thereto.

According to one example embodiment, rotation of the coagulation solution may be realized during the spinning of the dispersion. That is, the coagulation solution may be rotated during spinning to solidify the fibers and apply shear stress to the fibers at the same time. A rotation speed of the coagulation solution (a coagulation bath containing the coagulation solution) may be in a range of 1 to 100 rpm, desirably in a range of 20 to 50 rpm, but the present invention is not limited thereto. The shear stress is applied to the fibers (fibers under solidification) by the rotation of the coagulation solution, and the 2D nanomaterial may be oriented in an axial direction of the fiber due to such shear stress. That is, it is desirable in that the application of the shear stress in this coagulation solution may enhance an orientation property of the 2D nanomaterial in an axial direction of the fibers to improve mechanical/electrical properties of the fibers.

According to one example embodiment, a cross section of the nozzle through which the dispersion is spun may be in a round shape, but the present invention is not particularly limited thereto. A diameter of the nozzle (a diameter of a tip opening of the nozzle) may be, for example, in a range of approximately 50 to 1,000 μm, specifically in a range of approximately 100 to 1,000 μm, and more specifically in a range of approximately 150 to 800 μm, but the present invention is not limited thereto.

According to one example embodiment, the coagulation solution has miscibility with the dispersion medium, and thus may be used as long as the dispersion medium is a solvent (a solvent in which the 2D nanomaterial is not dispersed) capable of coagulating the spun fibers. Specifi-cally, when the 2D nanomaterial is a 2D nanomaterial including polar heteroatoms, the coagulation solution may include an alcohol-based solvent, a ketone-based solvent, an ester-based solvent, a non-polar solvent, or a mixed solvent thereof. The alcohol-based solvent may include methanol, ethanol, methoxyethanol, propanol, isopropanol, butanol, isobutanol, and the like, the ketone-based solvent may include acetone, methyl ethyl ketone, methyl isobutyl ketone, and the like, the ester-based solvent may include ethyl acetate, butyl acetate, 3-methoxy-3-methyl butyl acetate, and the like, and the non-polar solvent may include pentane, hexane, heptane, cyclopentane, cyclohexane, ben-zene, toluene, 1,4-dioxane, dichloromethane, methyl tert-butyl ether, chloroform, carbon tetrachloride, diethyl ether, and the like, but the present invention is not limited thereto.

Upon spinning, a temperature of the coagulation solution may be in a range of 10 to 50° C., specifically in a range of 20 to 30° C., and substantially room temperature, but the present invention is not limited thereto.

The spun fibers (flattened fibers) may be dried, and a post-treatment step of subjecting the spontaneously flattened fibers to a chemical reduction treatment may be further performed, when necessary. As one representative example, when the fibers contain graphene oxide, the fibers may be converted into flattened graphene fibers by means of such a reduction treatment. It is desirable that the reduction treat-ment is a method generally used to chemically reduce typical 2D nanomaterials.

For example, the chemical reduction treatment may be performed by supplying a reducing gas to the flattened fiber. The reducing gas may be a gas (such as HI, and the like) containing hydrogen and a halogen. In this case, a tempera-ture of the reducing gas may be in a range of 50 to 90° C., but the present invention is not limited thereto.

Preparation Example 1

Fabrication of Graphene Oxide

Graphene oxide (GO) was fabricated from graphite pow-der (GK) using a modified Hummers method.

Specifically, 1 g of graphite was mixed with 35 g of potassium permanganate (KMnO$_4$), 40 mL of sulfuric acid, and 5 mL of phosphoric acid, and the resulting graphite solution was sealed and oxidized at 35° C. for 2 hours. Thereafter, the graphite solution was transferred to 300 mL of ice pellets, and 20 mL of hydrogen peroxide was added thereto, and the resulting mixture was stirred at 300 rpm for 30 minutes. Then, the mixture was filtered through a filter, and washed with 1 M hydrochloric acid. The mixture was centrifuged at 8,000 rpm for 30 minutes to remove unreacted graphite. Finally, the mixture was dialyzed for 2 weeks using a dialysis membrane (MWCO: 6000-8000) in order to obtain the purified graphene oxide (in a water-dispersed state). An average diameter of the fabricated graphene oxide was 2.59 μm.

Preparation Example 2

Fabrication of Electrochemically Exfoliated Graphene

Graphite foil (thickness: 0.25 mm; Alfa Aesar) was used as an anode, a Pt electrode was used as a cathode, and a solution obtained by dissolving 3.6 g of $Na_2SO_4$ in 250 g of deionized water was used as an electrolyte. A voltage of +10 V was applied to the anode for 10 minutes so that an expanded graphite flake was exfoliated from the graphite foil. The expanded graphite flake was refined with deionized water in a vacuum filter equipped with a membrane filter (pore size: 0.45 μm), and then re-dispersed in N-methyl-2-pyrrlidone (NMP). The fabricated expanded graphite flake-NMP dispersion was sonicated with high power for 20 minutes to fabricate electrochemically exfoliated graphene. Then, the dispersion was centrifuged at 4,000 rpm for 30 minutes to remove unexfoliated graphite flake and collect a supernatant (a solution in which the exfoliated graphene was dispersed in NMP). An average diameter of the fabricated electrochemically exfoliated graphene (EG) was 3.20 μm.

EXAMPLES

The graphene oxide fabricated in Preparation Example 1 was dispersed in N-methyl-2-pyrrlidone (NMP) in a solvent exchange method using a rotary evaporator to prepare a dispersion of graphene oxide having a concentration of 13 mg/mL. Specifically, the aqueous dispersion of graphene oxide fabricated in Preparation Example 1 was centrifuged at 17,000 rpm for an hour to remove water from an upper portion, thereby to prepare a high-density graphene oxide solution. Thereafter, MNP (anhydrous NMP) was added to the high-density graphene oxide solution obtained in the solvent exchange method, and water was then removed for 2 days using a rotary vacuum evaporator whose temperature was maintained at 28° C. Then, NMP was added to prepare a dispersion (hereinafter referred to as "GO/NMP dispersion") in which graphene oxide was dispersed in NMP at a concentration of 13 mg/mL.

Also, the graphene dispersion prepared in Preparation Example 2 was centrifuged at 17,000 rpm for 30 minutes to remove the solvent, thereby to prepare a dispersion (hereinafter referred to as "EG/NMP dispersion") in which electrochemically exfoliated graphene was dispersed in NMP at the same concentration (13 mg/mL) as the GO dispersion.

A dispersion (hereinafter referred to as "GO-EG/NMP dispersion"; total concentration of solid contents: 13 mg/mL) in which the graphene oxide and the electrochemically exfoliated graphene were dispersed in NMP was prepared by mixing the prepared GO/NMP dispersion and the EG/NMP dispersion. In this case, the GO graphene and the EG dispersion were mixed so that a weight ratio of the electrochemically exfoliated graphene in the solid contents was 25% by weight (hereinafter referred to as "75GO-25EG"), 50% by weight (hereinafter referred to as "50GO-50EG") or 75% by weight (hereinafter referred to as "25GO-75EG"), based on the total weight (100% by weight) of the solid contents (graphene oxide+electrochemically exfoliated graphene) in the GO-EG/NMP dispersion.

Also, deionized water was added to each of the GO/NMP dispersion, the EG/NMP dispersion, and the GO-EG/NMP dispersion and mixed so that a weight ratio of water in the dispersion medium was 1% by weight (hereinafter referred to as "NMP1W"), 2% by weight (hereinafter referred to as "NMP2W"), 3% by weight (hereinafter referred to as "NMP3W"), 4% by weight (hereinafter referred to as "NMP4W"), 6% by weight (hereinafter referred to as "NMP6W"), 8% by weight (hereinafter referred to as "NMP8W"), and 10% by weight (hereinafter referred to as "NMP10W"), based on the total amount (100% by weight) of the dispersion medium (NMP and water) in the dispersion. As a general example of the prepared dispersion, a 75GO-25EG/NMP4W dispersion refers to a dispersion in which a ratio of the electrochemically exfoliated graphene in the solid contents was 25% by weight and a ratio of water in the dispersion medium was 4% by weight, and the other dispersions were also generally named in the same manner. In this case, the fabricated fibers were also generally named in the same manner using the general names of the respective dispersions and the corresponding dispersions. As one example, a fiber fabricated by spinning the 75GO-25EG/NMP4W dispersion was generally named a "75GO-25EG/NMP4W fiber," and a fiber fabricated by spinning the GO/NMP1W dispersion was generally named a "GO/NMP1W fiber."

Each of the prepared dispersions (spinning solutions) was spun through a wet spinning process, and dried in the air to fabricate 2D nanomaterial fibers. The spinning conditions were as follows. Spinning conditions: Spinning solution temperature: 25° C., Discharge speed of spinning solution: 0.4 mL/min, Round nozzle diameter (inner diameter): 500 μm, Acetone coagulation solution in the case of dispersion of graphene oxide alone, Coagulation solution (mixed volume ratio=ethyl acetate 1: acetone 3) as a mixed solution of acetone and ethyl acetate in the case of mixed dispersion of graphene oxide and electrochemically exfoliated graphene, Coagulation solution temperature: 25° C., and Rotation speed of coagulation solution bath: 30 rpm (elongation ratio=1.3).

A coagulation time of the fibers (a time required to complete the coagulation of the fibers) during the spinning of the GO/NMP1W dispersion was approximately 12 seconds, a coagulation time of the fibers during the spinning of the GO/NMP2W dispersion was approximately 19 seconds, a coagulation time of the fibers during the spinning of the GO/NMP4W dispersion was approximately 45 seconds, a coagulation time of the fibers during the spinning of the GO/NMP6W dispersion was approximately 60 seconds, and a coagulation time of the fibers during the spinning of the GO/NMP8W dispersion was approximately 75 seconds. In practice, the coagulation time increased relative to the content of water to be added.

When the fabricated fibers were reduced, the reduction was performed under the following conditions. Reduction conditions: Fibers dried in the air for 6 hours without any separate washing process after spinning, reduction using hydroiodic acid steam at 70° C., reduction time of 12 hours, and washing with ethanol to remove residual hydroiodic acid. In this case, when the spun fibers were subjected to a reduction treatment, the corresponding fibers generally named under the designation of "r-" prior to the general name. As one example, the 75GO-25EG/NMP4W fiber refers to a fiber fabricated by the spinning, and the r-75GO-25EG/NMP4W fiber refers to a 75GO-25EG/NMP4W fiber subjected to the reduction treatment.

FIGS. 1A-1D show an optical image and polarizing microscopic images observed for the GO/NMP dispersion, the GO/NMP2W dispersion, and the 75GO-25EG/NMP2W dispersion. Specifically, FIG. 1A is an optical image determined after the GO/NMP dispersion (GOw0 in FIG. 1A) and the GO/NMP2W dispersion (GOw2 in FIG. 1A) were kept for 2 weeks. In this case, it can be seen that graphene oxide was precipitated in the dispersion medium to which water was not added, whereas the graphene oxide was stably dispersed in the dispersion medium containing 2% by weight of water.

Figure 1B:
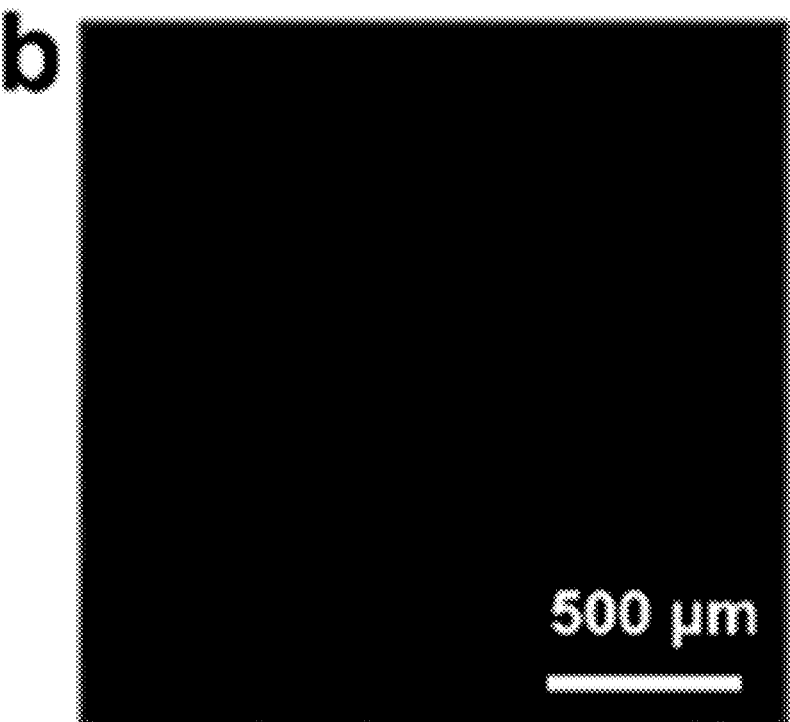
Figure 1C:
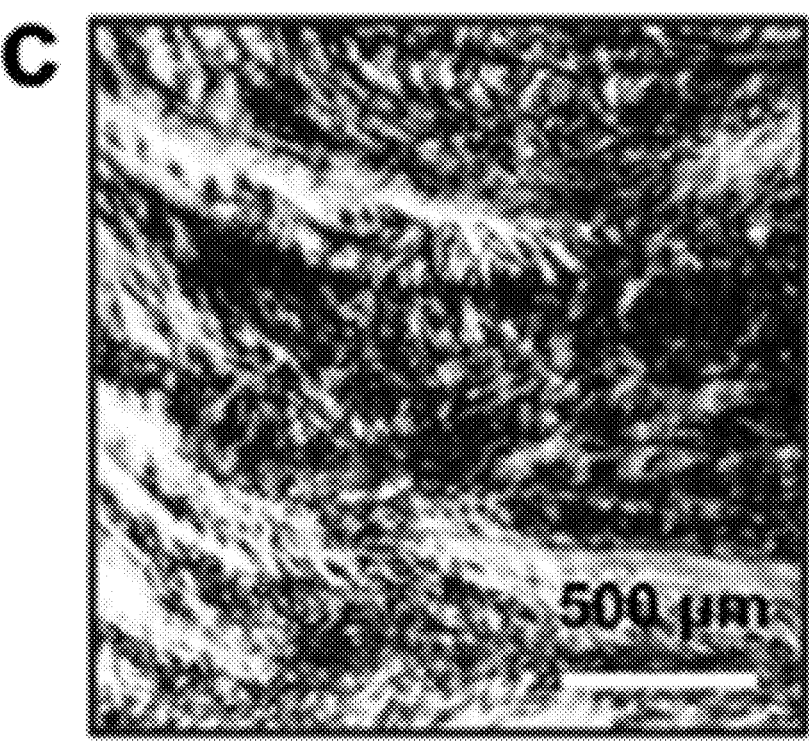
Figure 1D:
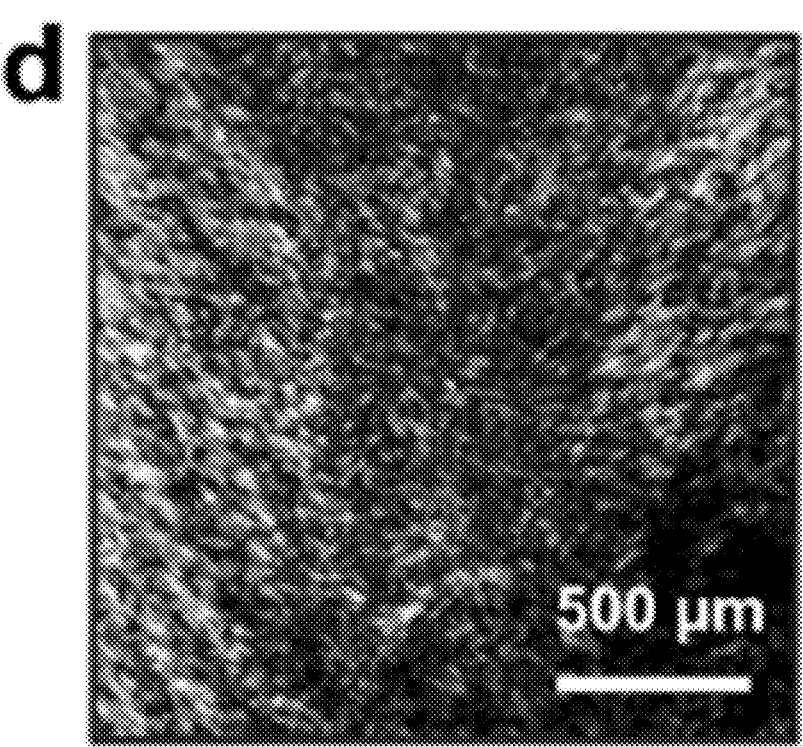

Also, FIG. 1B is a polarizing microscopic image of the GO/NMP dispersion, FIG. 1C is a polarizing microscopic image of the GO/NMP2W dispersion, and FIG. 1D is a polarizing microscopic image of the 75GO-25EG/NMP2W dispersion. As shown in FIGS. 1B to 1D, it can be seen that graphene oxide did not form a liquid-crystal phase in the dispersion medium to which water was not added, and that the graphene oxide alone and the mixtures of graphene oxide and graphene (electrochemically exfoliated graphene) also had liquid crystallinity (typical Schlieren texture) even when the dispersion medium contained only 2% by weight of water. Like the results of FIGS. 1C and 1D, it was confirmed that each of the dispersions in which the dispersion medium contained 2% by weight or more of water and also contained the graphene oxide had liquid crystallinity. Because a strong interaction between water and functional groups on a surface of graphene oxide existed, it can be interpreted that the graphene oxide was hydrated by the added water, and exhibited liquid crystallinity similar to the water-dispersed state, but the present invention is not particularly limited thereto.

Figure 2A:
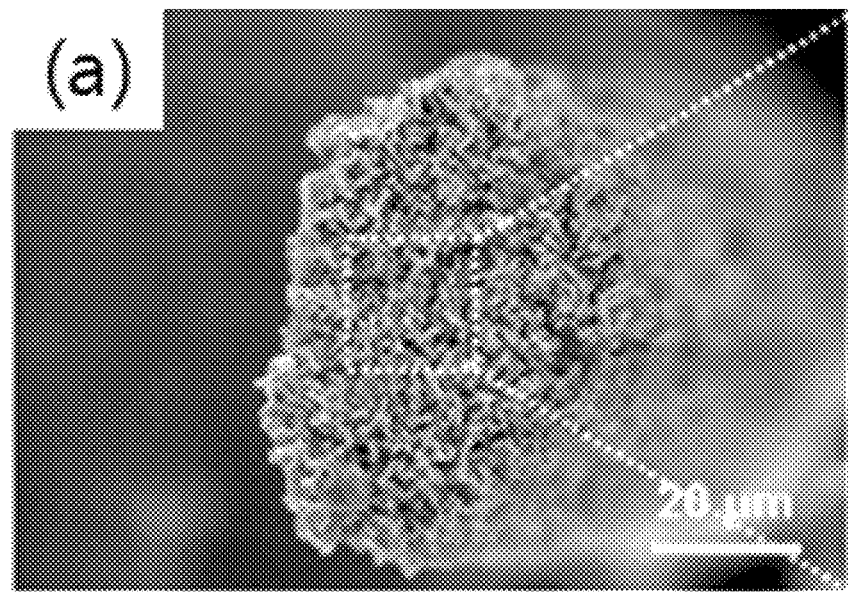
FIGS. 2A-2D show scanning electron microscopic images observed for cross sections of fibers fabricated according to one embodiment of the present invention.
Figure 2B:
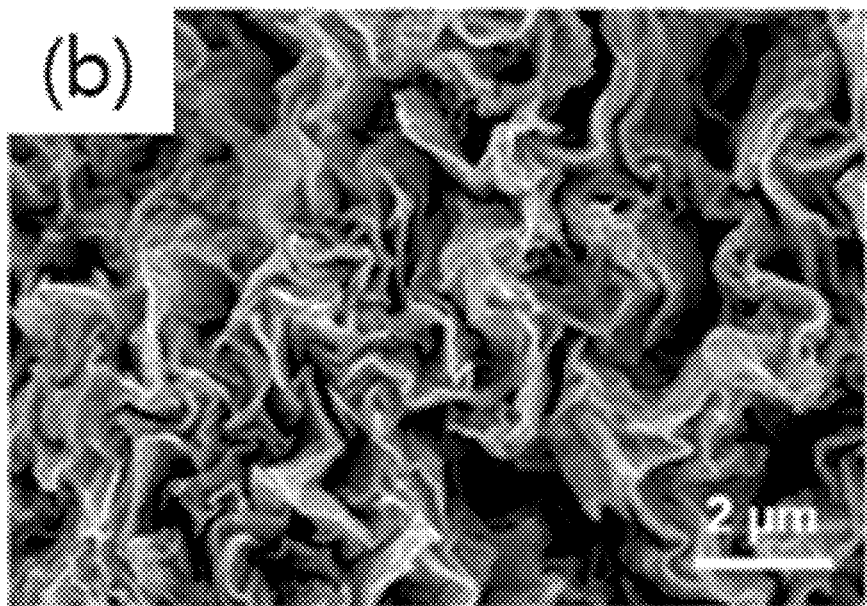
Figure 2C:
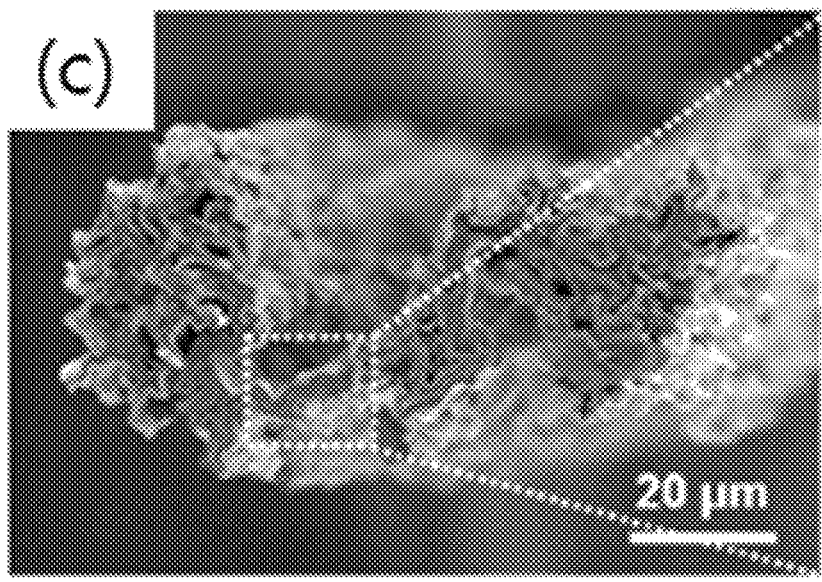
Figure 2D:
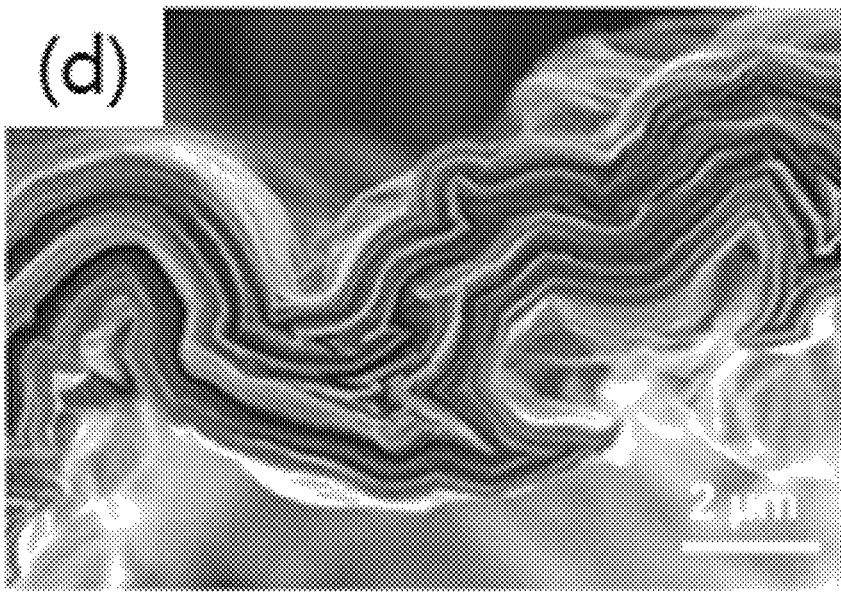

FIGS. 2A-2D show scanning electron microscopic images (FIGS. 2A and 2B) observed for the cross sections of the 75GO-25EG/NMP1W fiber, and scanning electron microscopic images (FIGS. 2C and 2D) observed for the cross sections of the 75GO-25EG/NMP8W fiber. FIG. 2B is a SEM image of the rectangular dotted line area shown in FIG. 2A observed at high magnification, and FIG. 2D is a SEM image of the rectangular dotted line area shown in FIG. 2C observed at high magnification.

As shown in FIG. 2, it can be seen that, when the spontaneous flattening did not occur while the diffusion of the dispersion medium into the coagulation solution was removed, the fibers having a substantially round cross section were fabricated, and the graphene-based materials (graphene oxide, electrochemically exfoliated graphene) were folded and wrinkle, and filled into an inner space of the fibers.

Meanwhile, when the diffusion of the dispersion medium contained in the fibers spun in the coagulation solution was slowly removed due to the addition of water, the 2D materials (graphene, graphene oxide) were spontaneously stacked in a layer-by-layer manner due to the high intrinsic anisotropy of the 2D materials in the coagulation process, which resulted in fabrication of the fibers having a plate-type cross section.

Figure 3A:
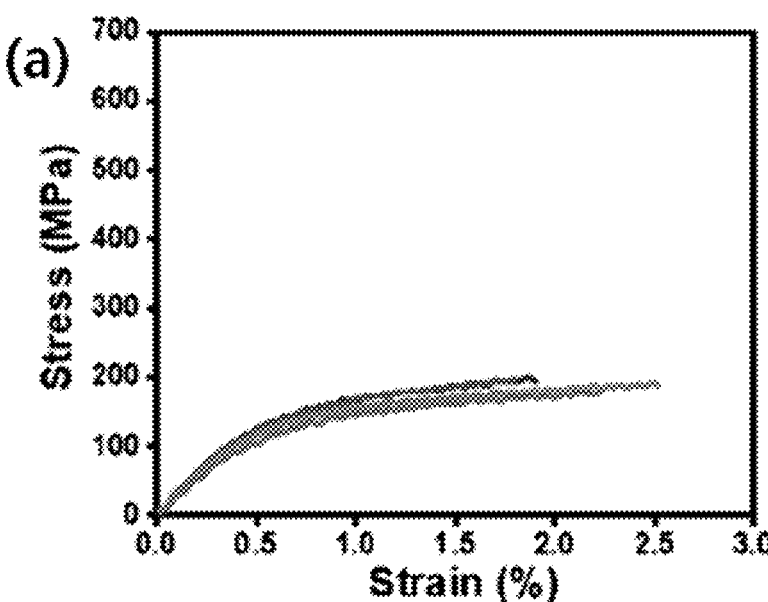
FIGS. 3A and 3B are diagrams showing the results of measuring mechanical properties of the fibers fabricated according to one embodiment of the present invention.
Figure 3B:
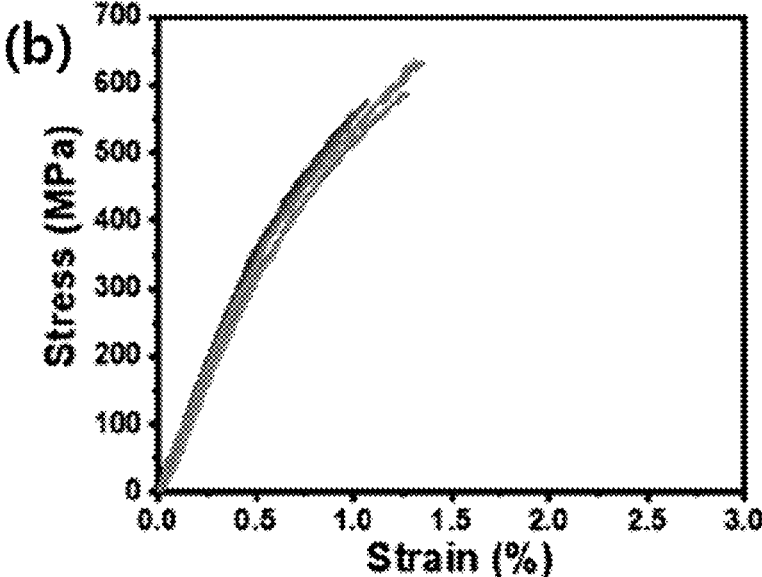

FIGS. 3A and 3B are diagrams showing the results of measuring mechanical properties of each of the r-75GO-25EG/NMP1W fiber (FIG. 3A) and the r-75GO-25EG/NMP8W fiber (FIG. 3B). Here, the results obtained through the repeated tests were overlapped.

As shown in FIG. 3A, it can be seen that, because the spontaneous flattening did not occur, the fibers having a substantially spherical cross section merely had a tensile strength of 186 MPa and a modulus of elasticity (Young's modulus) of 29.6 GPa due to the defects (such as bending and wrinkles) of the fibers. On the other hand, as shown in FIG. 3B, it can be seen that, when the 2D material was oriented in an axial direction of the fibers, and simultaneously stacked in a layer-by-layer manner due to the spontaneous flattening, the fibers had a tensile strength of 597

MPa and a modulus of elasticity of 70.9 GPa. As a result, it can be seen that the tensile strength of the fibers having a circular cross section was improved by 320%, and the modulus of elasticity of the fibers was improved by 239%.

When the dispersions having a different content of the electrochemically exfoliated graphene and a different content of water in the dispersion medium were spun, the dispersions containing graphene oxide but containing no water were not fibrillized through spinning.

It was confirmed that the spontaneous flattening occurred in all the samples to which water was added at 4% by weight or more in the case of the dispersion containing only the graphene oxide as the solid contents, and the spontaneous flattening occurred in all the samples to which water was added at 8% by weight or more in the case of the dispersion containing 25% by weight of electrochemically exfoliated graphene in the solid contents.

Figure 4:
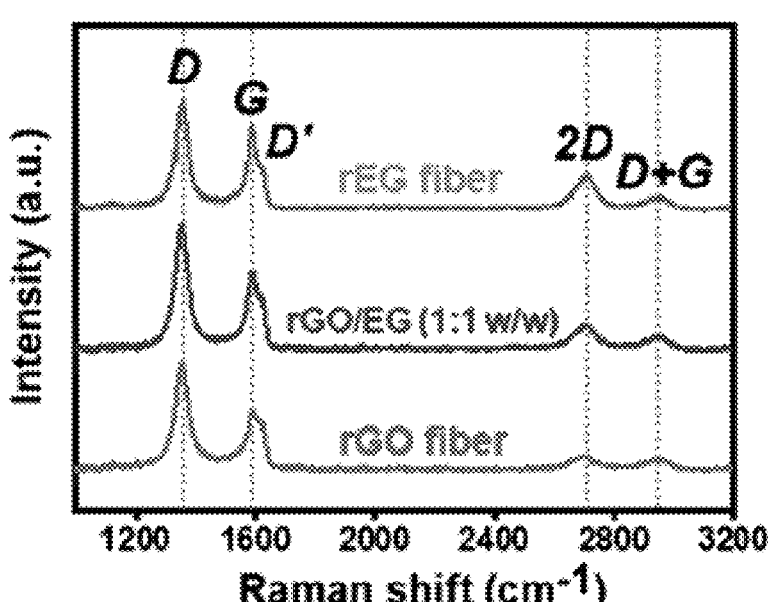
FIG. 4 is a diagram showing the results of measuring the Raman spectra of the fibers fabricated according to one embodiment of the present invention.

FIG. 4 is a diagram showing the results of measuring the Raman spectra of the r-GO/NMP8W fiber (rGO fiber in FIG. 4), the r-50GO-50EG/NMP8W fiber (rGO/EG (1:1 w/w) in FIG. 4), and the r-EG/NMP8W fiber (rEG fiber in FIG. 4).

It can be seen that the $I_D/I_G$ decreased from 1.75 to 1.34 with an increasing content of the electrochemically exfoliated graphene (EG) in the chemically reduced fibers. Such a decrease in the $I_D/I_G$ means that the types of graphene (including reduced graphene oxide) constituting the fibers had reduced defects. Also, a D' band (approximately 1,610 cm$^{-1}$) also decreased with an increasing content of the electrochemically exfoliated graphene (EG), indicating that the defects in a carbon crystal structure were reduced. In addition, a 2D peak (approximately 2,700 cm$^{-1}$) increased with an increasing content of the electrochemically exfoliated graphene (EG), indicating the growth of graphitic structure crystals.

Figure 5A:
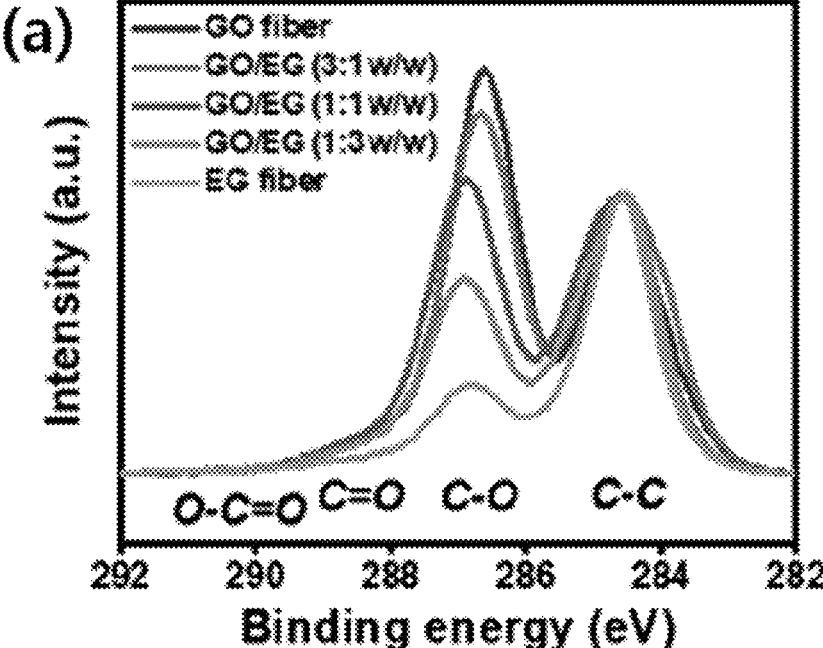
FIGS. 5A and 5B are diagrams showing the C is X-ray photoelectron spectroscopy (XPS) spectra of the fibers fabricated according to one embodiment of the present invention.
Figure 5B:
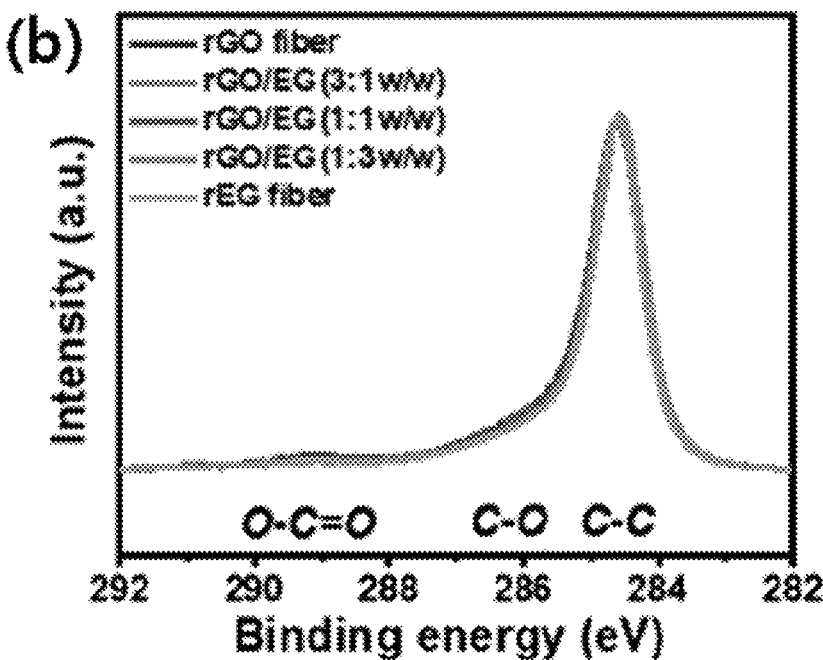

FIG. 5A is a diagram showing the C is X-ray photoelectron spectroscopy (XPS) spectra of the GO/NMP8W fiber (GO fiber in FIG. 5A), the 75GO-25EG/NMP8W fiber (GO/EG (3:1 w/w) in FIG. 5A), the 50GO-50EG/NMP8W fiber (GO/EG (1:1 w/w) in FIG. 5A), the 25GO-75EG/NMP8W fiber (GO/EG (1:3 w/w) in FIG. 5A), and the EG/NMP8W fiber (EG fiber in FIG. 5A), and FIG. 5B is a diagram showing the C is X-ray photoelectron spectroscopy (XPS) spectra of the r-GO/NMP8W fiber (rGO fiber in FIG. 5B), the r-75GO-25EG/NMP8W fiber (rGO/EG (3:1 w/w) in FIG. 5B), the r-50GO-50EG/NMP8W fiber (rGO/EG (1:1 w/w) in FIG. 5B), the r-25GO-75EG/NMP8W fiber (rGO/EG (1:3 w/w) in FIG. 5B), and the r-EG/NMP8W fiber (rEG fiber in FIG. 5B).

As shown in FIG. 5A showing the results of the fibers which were not subjected to the reduction treatment, it can be seen that the peak intensity caused by a carbon-to-oxygen bond gradually decreased with an increasing content of the graphene in the fibers. Based on the C is spectra of the fibers subjected to the reduction treatment, it can also be seen that both of the C—O (approximately 286.7 eV) and C=O (approximately 288.3 eV) functional groups were effectively removed by the reduction treatment (reduction by HI steam) at a low temperature of 7012. In particular, the C/O atomic ratio (C/O=11.13) of the pure graphene (EG) fibers was significantly higher than the C/O atomic ratio (C/O=8.84) of the pure graphene oxide fibers in the reduced fibers, and the C/O atomic ratio also proportionally increased with an increasing content of graphene (EG) in the fibers.

Figure 6:
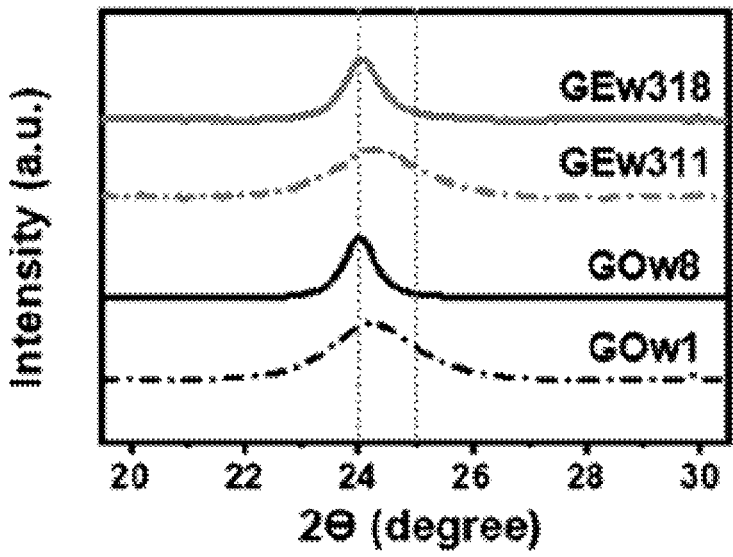
FIG. 6 is a diagram showing X-ray diffraction patterns of the fibers fabricated according to one embodiment of the present invention.

FIG. 6 is a diagram showing X-ray diffraction patterns of the fabricated fibers.

In FIG. 6, GOw1 represents an r-GO/NMP1W fiber, GOw8 represents an r-GO/NMP8W fiber, GEW311 represents an r-75GO-25EG/NMP1W fiber, and GEW318 represents an r-75GO-25EG/NMP8W fiber.

When the X-ray diffraction results of the r-GO/NMP1W fiber and the r-75GO-25EG/NMP1W fiber, both of which had a substantially spherical cross section, were compared with those of the r-GO/NMP8W fiber and the r-75GO-25EG/NMP8W fiber, both of which had a plate-type cross section due to the spontaneous flattening, it can be seen that the fibers had almost a similar interlayer spacing, but had a highly different peak shape. Specifically, it can be seen that the peak broadening of the spontaneously flattened fibers significantly decreased, compared to those of the fibers having a spherical cross section. Based on the facts, it can be seen that the alignment of a graphene sheet (including reduced graphene oxide) was significantly improved in the spontaneously flattened fibers.

Figure 7A:
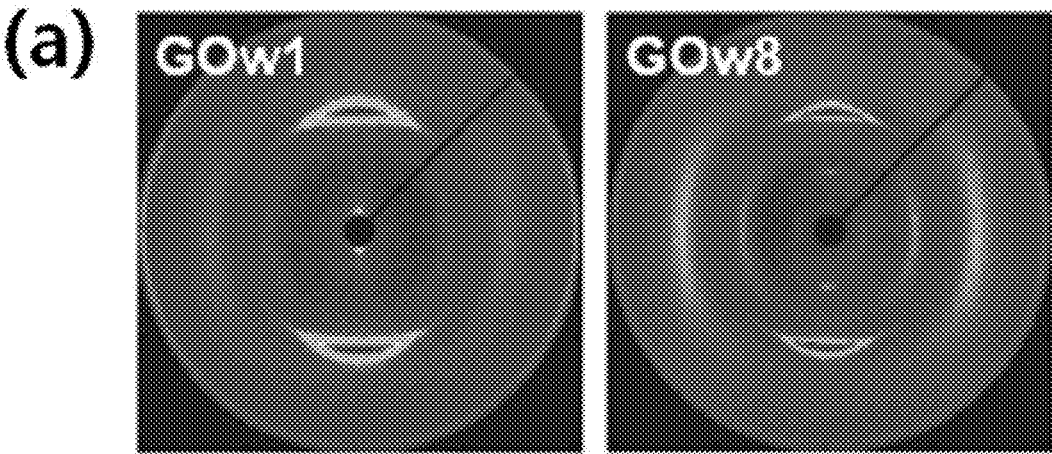
FIGS. 7A and 7B are an image and a diagram showing the wide-angle X-ray scattering (WAXS) spectra of the fibers fabricated according to one embodiment of the present invention.
Figure 7B:
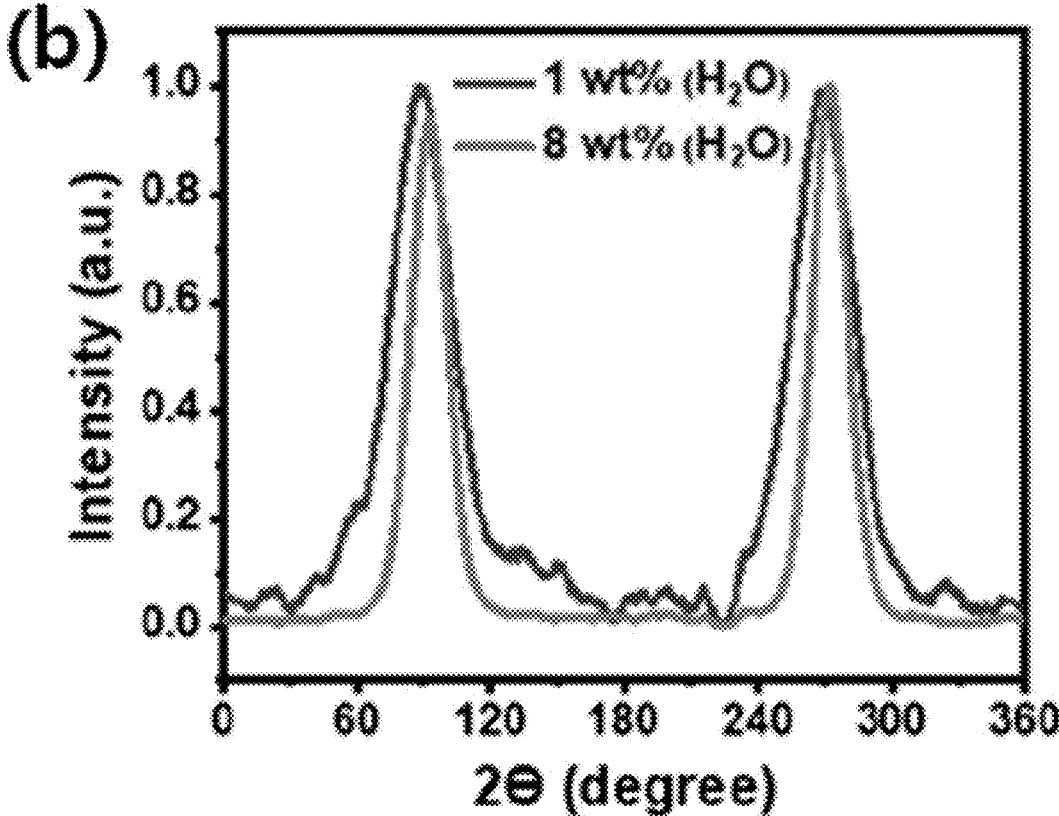

A degree of alignment of graphene in the fibers was observed using wide-angle X-ray scattering (WAXS). FIG. 7A is a diagram showing the 2-D wide-angle X-ray scattering results of the r-GO/NMP1W fiber (GOw1 in FIG. 7A) and the r-GO/NMP8W fiber (GOw8 in FIG. 7A), and FIG. 7B is a diagram showing the wide-angle X-ray scattering spectra of the r-75GO-25EG/NMP1W fiber (1% by weight ($H_2O$) in FIG. 7B) and the r-75GO-25EG/NMP8W fiber (8% by weight ($H_2O$) in FIG. 7B) according to the azimuth (an azimuthal angle). WAXS analysis was performed using the Pohang Accelerator Laboratory's 4C SAXS II beamline (0.675 Å) X-rays. As shown in FIGS. 7A and 7B, it can be seen that the (002) plane alignment was improved in the spontaneously flattened fiber. The Herman's orientation parameters were calculated using the wide-angle X-ray scattering results according to the azimuthal angle. As a result, it can be seen that the Herman's orientation parameters of the r-GO/NMP1W fiber and the r-75GO-25EG/NMP1W fiber were 0.766 and 0.807, respectively, and the Herman's orientation parameters of the r-GO/NMP8W fiber and r-75GO-25EG/NMP8W fiber were 0.914 and 0.923, respectively, indicating that the degree of orientation was remarkably improved due to the spontaneous flattening.

The electrical characteristics of the fibers subjected to a reduction treatment were determined. As a result, it can be seen that the electrical conductivity of the r-GO/NMP1W fiber was 297 S/cm, and the electrical conductivity of the r-75GO-25EG/NMP1W fiber was 346 S/cm. The electrical conductivities of the spontaneously flattened r-GO/NMP8W and r-75GO-25EG/NMP8W fibers were 461 S/cm and 527 S/cm, respectively, indicating that the spontaneously flattened r-GO/NMP8W and r-75GO-25EG/NMP8W fibers had remarkably improved electrical characteristics, compared to the fibers having a circular cross section, and the fibers flattened in the same manner also had further improved electrical characteristics when the graphene (EG) was incorporated into the fibers.

The mechanical properties of the fibers fabricated by spinning were determined in a similar manner as in FIG. 3. As a result, it can be seen that the tensile strength and the modulus of elasticity of the r-GO/NMP1W fiber were 207 MPa and 18.9 GPa, respectively, and the tensile strength and the modulus of elasticity of the r-75GO-25EG/NMP1W fiber were 186 MPa and 29.6 GPa, respectively. The tensile strength and modulus of elasticity of the spontaneously flattened r-GO/NMP8W fiber were 558 MPa and 55.0 GPa, respectively, and the tensile strength and modulus of elasticity of the r-75GO-25EG/NMP8W fiber were 597 MPa and 70.9 GPa, respectively. It can be seen that the mechanical properties were further improved when graphene was introduced into the fibers, indicating a synergy effect between the liquid crystalline graphene oxide (GO) and the highly crystalline graphene (EG). It may be interpreted that the mechanical properties are improved due to the stronger n-n intralayer interaction of the graphene (EG) having a high average lateral carbon crystallite dimension of 12.5 nm, the value of which is higher than the average lateral carbon crystallite dimension (9.57 nm) of the GO (reduced GO), but the present invention is not particularly limited by this interpretation.

To test the flexibility of the fibers, a bending test was performed 1,000 times on the r-75GO-25EG/NMP8W fiber at a bending radius of 6 mm. As a result, the fibrous phase was stably maintained and no significant physical damage occurred in the r-75GO-25EG/NMP8W fiber. Considering the fractures of the fiber when the same bending test was performed on the thermally reduced fibers, it can be seen that the mechanical properties of fibers were favorable for a low-temperature chemical reduction reaction. In practice, it was confirmed that the average fracture toughness of the fibers (the thermally reduced 75GO-25EG/NMP8W fiber), which were thermally reduced under the conditions of an annealing temperature of 1,000° C., an argon flow atmosphere of 100 sccm, and an annealing time of one hour, was merely 0.37 $MJ/m^3$, whereas the average fracture toughness of the r-75GO-25EG/NMP8W fiber highly increased to 4.23 $MJ/m^3$. Also, since the electrical characteristics were not deteriorated even when the bending test was performed 1,000 times at a bending radius of 6 mm, the fibers showed substantially the same electrical characteristics (the same current amount upon application of 10 V).

The 2D nanomaterial fiber according to embodiments of the present invention can have a plate-type cross section formed by orienting a 2D nanomaterial in a longitudinal direction of the fiber and simultaneously spontaneously flattening the 2D nanomaterial in a fibrillization process using wet spinning, and stacking the oriented 2D nanomaterial.

Due to such a stacked structure of the 2D nanomaterial, the 2D nanomaterial fiber can be free from the pores in the fiber or the defects (such as folding or bending) of the 2D nanomaterial, and the mechanical properties and electrical characteristics of the fiber can be remarkably improved because the 2D nanomaterial has a layer-by-layer stacked structure.

Hereinabove, although the 2D nanomaterial fiber and the method of fabricating the same according to embodiments of the present invention have been described with reference to the specific subject matters, embodiments thereof, and the accompanying drawings, they have been provided only for assisting in the entire understanding of the present invention. Therefore, the present invention is not limited to the example embodiments. Various modifications and changes may be made from this description by those skilled in the art to which the present invention pertains.

Therefore, the scope and spirit of the present invention should not be limited to the embodiments as described herein, and the following claims as well as all modifications equal or equivalent to the claims are intended to fall within the scope and spirit of the invention.

What is claimed is:
1. A nanomaterial fiber containing a 2-dimensional (2D) nanomaterial oriented in a longitudinal direction of the fiber,
  wherein the oriented 2D nanomaterial forms nanomaterial layers which are spontaneously stacked layer-by-layer,
    wherein a cross section parallel to the nanomaterial layer is a flat plate-type fibrous cross section, and wherein a Herman's orientation parameter based on the wide-angle X-ray scattering (WAXS) results is greater than or equal to 0.82.

2. The nanomaterial fiber of claim 1, wherein the flat plate-type fibrous cross section is elongated in a transverse direction of the fiber, and a ratio (D/t) of a thickness (t) of the flat plate-type fibrous cross section to a length (D) of the plate-type fibrous cross section in a transverse direction is greater than or equal to 2.

3. The nanomaterial fiber of claim 1, wherein the 2D nanomaterial comprises graphene, graphene oxide, MXene, a transition metal dichalcogenide (TMD), a metal oxide, silicene, germanene, borophene, stanene, phosphorene, hexagonal-boron nitride (h-BN), or a combination thereof.

4. The nanomaterial fiber of claim 1, wherein the fiber further contains polymers.

5. The nanomaterial fiber of claim 1, wherein a modulus of elasticity of the fiber satisfies the following Expression 1:

$$YM1/YM2 \geq 2, \tag{Expression 1}$$

wherein YM1 represents a modulus of elasticity of the nanomaterial fiber, and YM2 represents a modulus of elasticity of a reference fiber which is a nanomaterial fiber having a circular cross section, which consists of the same 2D nanomaterial.

6. The nanomaterial fiber of claim 1, wherein a tensile strength of the fiber satisfies the following Expression 2:

$$TS1/TS2 \geq 2.5, \tag{Expression 2}$$

wherein TS1 represents a tensile strength of the nanomaterial fiber, and TS2 represents a tensile strength of a reference fiber which is a nanomaterial fiber having a circular cross section, which consists of the same 2D nanomaterial.

\* \* \* \* \*